United States Patent Office 3,396,162
Patented Aug. 6, 1968

3,396,162
2,4 - BIS - SUBSTITUTED - BENZYLIDENE OR -PYRIDYLMETHYLENE - 8 - THIABICYCLO [3.2.1]OCTAN-3-ONES
Malcolm R. Bell, East Greenbush, N.Y., assignor to Sterling Drug Inc., New York, N.Y., a corporation of Delaware
No Drawing. Filed May 28, 1964, Ser. No. 371,126
16 Claims. (Cl. 260—240)

ABSTRACT OF THE DISCLOSURE 2,4-bis(substituted-benzylidene) or -pyridylmethylene-8-thiabicyclo[3.2.1]octan-3-ones and S-oxygenated derivatives thereof, having pharmacodynamic properties, are prepared by condensing 8-thiabicyclo[3.2.1]octan-3-one with the appropriate benzaldehyde or pyridinecarboxaldehyde, followed, if desired, by oxidation of the sulfur atom with hydrogen peroxide or a like oxidizing agent.

This invention relates to new bicyclic compounds, and in particular is concerned with 8-thiabicyclo[3.2.1]octan-3-ones having substituted arylmethylene groups in the 2- and 4-positions and with oxidation products thereof.

The compounds of the invention have the following structural formula:

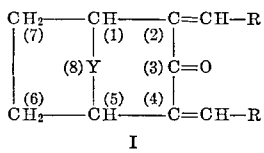

I wherein Y is a member of the group consisting of S, SO and $SO_2$; and R is a member of the group consisting of halophenyl, nitrophenyl and pyridyl.

In the halophenyl (including fluorophenyl, chlorophenyl, bromophenyl and iodophenyl), nitrophenyl and pyridyl groups, the halogen, nitro and ring nitrogen substituents, respectively, can have any orientation (ortho, meta or para) with respect to the point of attachment of the group R to the rest of the molecule. The halophenyl, nitrophenyl and pyridyl groups represented by R also can possess additional conventional substituents, inert under the conditions of the methods used for preparing the compounds of the invention. Such additional substituents include lower-alkyl of 1–4 carbon atoms, lower-alkoxy of 1–4 carbon atoms, halogen, nitro, trifluoromethyl, lower-alkylmercapto of 1–4 carbon atoms, lower-alkylsulfonyl of 1–4 carbon atoms, and the like.

The compounds of Formula I are prepared by causing a ketone of Formula II

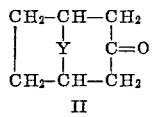

II to react with an aldehyde, H—CO—R, under alkaline conditions. The reaction takes place at room temperature and can be accelerated by heating, as is especially suitable in the case of more hindered aldehydes. In accordance with the stoichiometry involved, it is preferred to use two molar equivalents of aldehyde to one of the bicyclic ketone II.

The compounds of Formula I wherein Y is a sulfoxide (SO) or a sulfone ($SO_2$) linkage are prepared by oxidation of the compounds wherein Y is a sulfide (S) linkage. The oxidation can be carried out either on a compound of Formula I wherein Y is S, or on the intermediate of Formula II wherein Y is S, prior to the condensation with an aldehyde. The oxidation can be effected by means of any reagent known to oxidize sulfides to sulfoxides and sulfones. These reagents include hydrogen peroxide, organic peracids, such as peracetic acid and perbenzoic acid, chromic anhydride, potassium permanganate, nitric acid, hypohalites and iodosobenzene. The use of a limited amount of oxidizing agent produces the sulfoxide, which in turn can serve as an intermediate for preparation of the sulfone, by application of excess oxidizing agent and more vigorous reaction conditions.

Pharmacological and chemotherapeutic evaluations of the compounds of the invention in experimental animals have shown the compounds ot have the following useful properties: potentiation of barbiturate hypnosis, anti-Metrazol (anticonvulsant) activity, psychomotor depressant activity, inhibition of influenza pathogenesis, and inhibition of endotoxin-induced lung inflammation. The compounds are prepared for use by incorporating them in conventional oil or aqueous media for parenteral injection, or in tablet form with excipients for oral administration.

The structures of the compounds of the invention were established by the modes of preparation and by elementary analysis.

The following examples will further illustrate the invention without the latter being limited thereby.

Example 1.—2,4-bis(4-chlorobenzylidene)-8-thiabicyclo[3.2.1]octan-3-one [I; Y is S, R is $C_6H_4Cl$–4]

A mixture of 10 g. (0.0704 mole) of 8-thiabicyclo-[3.2.1]octan-3-one, 20 g. (0.142 mole) of 4-chlorobenzaldehyde and 25 ml. of methanol was treated in portions with swirling with 8 ml. of 10% aqueous sodium hydroxide. After the exothermic reaction had ceased, the mixture was cooled in ice and the solid product collected by filtration, washed with methanol and dried at 75° C. The product was dissolved in benzene containing a small proportion of heptane, the solution decolorized with activated charcoal, and most of the benzene removed by boiling it off. The recrystallized product was collected to give 16.5 g. of 2,4-bis(4-chlorobenzylidene)-8-thiabicyclo[3.2.1]octan-3-one in the form of a pale yellow solid, M.P. 215.6–216.8° C. (corr.).

Example 2

2,4 - bis(4 - nitrobenzylidene) - 8 - thiabicyclo[3.2.1] octan-3-one [I; Y is S, R is $C_6H_4NO_2$–4] was prepared from 8-thiabicyclo[3.2.1]octan-3-one and 4-nitrobenzaldehyde according to the procedure described above in Example 1. The product was recrystallized from pyridine and was obtained in the form of an orange solid, M.P. 260.0–264.8° C. (dec.) (corr.).

Example 3

2,4 - bis(4 - pyridylmethylene) - 8 - thiabicyclo[3.2.1] octan-3-one [I; Y is S, R is 4-pyridyl] was prepared from 8-thiabicyclo[3.2.1]octan-3-one and 4-pyridinecarboxaldehyde according to the procedure described above in Example 1. The product was recrystallized from toluene and was obtained in the form of a yellow solid, M.P. 248.0–251.8° C. (corr.)

Example 4

2,4 - bis(3 - pyridylmethylene) - 8 - thiabicyclo[3.2.1] octan-3-one [I; Y is S, R is 3-pyridyl] was prepared from 8-thiabicyclo[3.2.1]octan-3-one and 3-pyridinecarboxaldehyde according to the procedure described above in Example 1. The product was recrystallized from pyridine and was obtained in the form of a light yellow solid, M.P. 211.8–213.0° C. (corr.).

Example 5

2,4-bis(2-pyridylmethylene)-8-thiabicyclo[3.2.1]octan-3-one [I; Y is S, R is 2-pyridyl] was prepared from 8-thiabicyclo[3.2.1]octan-3-one and 2-pyridinecarboxaldehyde according to the procedure described above in Example 1. The product was recrystallized from isopropyl alcohol and was obtained in the form of a light yellow solid, M.P. 157.2–158.8° C. (corr.).

By replacing the 4-chlorobenzaldehyde in Example 1 by a molar equivalent amount of 3-bromobenzaldehyde,
4-tertiarybutyl-3-nitrobenzaldehyde,
4-chloro-3,5-dinitrobenzaldehyde,
3,5-dibromobenzaldehyde,
4-ethoxy-3,5-diiodobenzaldehyde,
2-fluorobenzaldehyde,
4-iodobenzaldehyde,
2-chloro-4-methylsulfonylbenzaldehyde,
4-chloro-2-pyridinecarboxaldehyde,
6-methyl-3-pyridinecarboxaldehyde,
2,6-dimethyl-4-pyridinecarboxaldehyde, or
3-nitro-4-pyridinecarboxaldehyde, there can be prepared, respectively, 2,4-bis(3-bromobenzylidene)-8-thiabicyclo[3.2.1]octan-3-one,
2,4-(4-tertiary-butyl-3-nitrobenzylidene)-8-thiabicyclo[3.2.1]octan-3-one,
2,4-bis(4-chloro-3,5-dinitrobenzylidene)-8-thiabicyclo[3.2.1]octan-3-one,
2,4-bis(3,5-dibromobenzylidene)-8-thiabicyclo[3.2.1]octan-3-one,
2,4-bis(4-ethoxy-3,5-diiodobenzylidene)-8-thiabicyclo[3.2.1]octan-3-one,
2,4-bis(2-fluorobenzylidene)-8-thiabicyclo[3.2.1]octan-3-one,
2,4-bis(4-iodobenzylidene)-8-thiabicyclo[3.2.1]octan-3-one,
2,4-bis(2-chloro-4-methylsulfonylbenzylidene)-8-thiabicyclo[3.2.1]octan-3-one,
2,4-bis(4-chloro-2-pyridylmethylene)-8-thiabicyclo[3.2.1]octan-3-one,
2,4-bis(6-methyl-3-pyridylmethylene)-8-thiabicyclo[3.2.1]octan-3-one,
2,4-bis(2,6-dimethyl-4-pyridylmethylene)-8-thiabicyclo[3.2.1]octan-3-one, or
2,4-bis(3-nitro-4-pyridylmethylene)-8-thiabicyclo[3.2.1]octan-3-one.

Example 6.—2,4-bis(4-chlorobenzylidene)-8-thiabicyclo[3.2.1]octan-3-one 8,8-dioxide [I; Y is $SO_2$, R is $C_6H_4Cl$-4]

A mixture of 2.89 g. (0.00747 mole) of 2,4-bis(4-chlorobenzylidene)-8-thiabicyclo[3.2.1]octan-3-one (Example 1), 4.5 ml. of 30% hydrogen peroxide and 30 ml. of glacial acetic acid was refluxed for ten minutes. Upon cooling, the product precipitated and was collected and dried at 75° C. to give 2.78 g. of 2,4-bis(4-chlorobenzylidene)-8-thiabicyclo[3.2.1]octan-3-one 8,8-dioxide in the form of a light yellow solid, M.P. 243.6–244.8° C. (corr.).

By reducing the quantity of 30% hydrogen peroxide in the foregoing preparation to about 1.0 ml. there can be prepared 2,4-bis(4-chlorobenzylidene)-8-thiabicyclo[3.2.1]octan-3-one 8-oxide [I; Y is SO, R is $C_6H_4Cl$-4].

Example 7

2,4-bis(4-nitrobenzylidene)-8-thiabicyclo[3.2.1]octan-3-one 8,8-dioxide [I; Y is $SO_2$, R is $C_6H_4NO_2$-4] was prepared from 2,4-bis(4-nitrobenzylidene)-8-thiabicyclo[3.2.1]octan-3-one (Example 2) and hydrogen peroxide by the procedure of Example 6. The product was obtained in the form of a light yellow solid, M.P. 294.2–299.8° C. (dec.) (corr.).

Example 8.—2,4-bis(2-pyridylmethylene)-8-thiabicyclo[3.2.1]octan-3-one 8,8-dioxide [I; Y is $SO_2$, R is 2-pyridyl]

A mixture of 1.0 g. of 2,4-bis(2-pyridylmethylene)-8-thiabicyclo[3.2.1]octan-3-one (Example 5), 1.5 ml. of 30% hydrogen peroxide, 0.33 ml. of concentrated sulfuric acid and 10 ml. of glacial acetic acid was refluxed for ten minutes. The reaction mixture was cooled and a few drops of sodium hydroxide solution added. The precipitate which formed was collected and dried to give 2,4-bis(2-pyridylmethylene)-8-thiabicyclo[3.2.1]octan-3-one 8,8-dioxide, M.P. 232° C. (dec.) (uncorr.).

The sulfuric acid was added to protonate the pyridine rings and thus prevent N-oxide formation.

Example 9.—8-thiabicyclo[3.2.1]octan-3-one 8,8-dioxide [II; Y is $SO_2$]

A solution of 18.5 g. (0.117 mole) of potassium permanganate in 225 ml. of water was added dropwise during one and one-half hours to a stirred solution of 10.0 g. (0.0704 mole) of 8-thiabicyclo[3.2.1]octan-3-one in 80 ml. of glacial acetic acid, while holding the temperature of the reaction mixture below 30° C. Solid sodium bisulfite was then added in small portions to decompose the manganese dioxide which had formed, and the resulting solution was extracted with chloroform. The chloroform extracts were washed with water and with saturated sodium chloride solution, dried over anhydrous magnesium sulfate and concentrated to dryness. The residue was recrystallized from benzene to give 8-thiabicyclo[3.2.1]octan-3-one 8,8-dioxide, M.P. 294.6–295.8° C. (dec.) (corr.).

8-thiabicyclo[3.2.1]octan-3-one 8,8-dioxide was found to be fungistatic at a concentration of 1 mg./ml. against *T. mentagrophytes*.

8-thiabicyclo[3.2.1]octan-3-one 8,8-dioxide can be caused to react with 4-chlorobenzaldehyde, 4-nitrobenzaldehyde, 3-bromobenzaldehyde, or 2,6-dimethyl-4-pyridinecarboxaldehyde, according to the procedure of Example 1, to give, respectively, 2,4-bis(4-chlorobenzylidene)-8-thiabicyclo[3.2.1]octan-3-one 8,8-dioxide (Example 6), 2,4-bis(4-nitrobenzylidene)-8-thiabicyclo[3.2.1]octan-3-one 8,8-dioxide (Example 7), 2,4-bis(3-bromobenzylidene)-8-thiabicyclo[3.2.1]octan-3-one 8,8-dioxide, or 2,4-bis(2,6-dimethyl-4-pyridylmethylene)-8-thiabicyclo[3.2.1]octan-3-one 8,8-dioxide.

I claim:
1. A compound of the formula

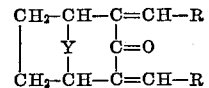

wherein Y is a member of the group consisting of S, SO and $SO_2$; and R is a member of the group consisting of halophenyl, nitrophenyl and pyridyl.

2. A compound of the formula

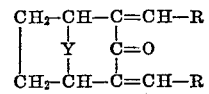

wherein Y is S and R is halophenyl.

3. A compound of the formula

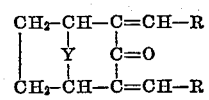

wherein Y is S and R is nitrophenyl.

4. A compound of the formula

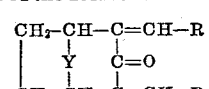

wherein Y is S and R is pyridyl.

5. A compound of the formula

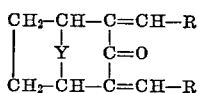

wherein Y is SO₂ and R is halophenyl.

6. A compound of the formula

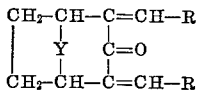

wherein Y is SO₂ and R is nitrophenyl.

7. A compound of the formula

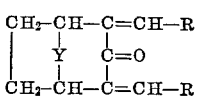

wherein Y is SO₂ and R is pyridyl.

8. 2,4 - bis(4-chlorobenzylidene)-8-thiabicyclo[3.2.1]-octan-3-one.

9. 2,4 - bis(4-nitrobenzylidene)-8-thiabicyclo[3.2.1]-octan-3-one.

10. 2,4 - bis(4-pyridylmethylene)-8-thiabicyclo[3.2.1]-octan-3-one.

11. 2,4 - bis(3-pyridylmethylene)-8-thiabicyclo[3.2.1]-octan-3-one.

12. 2,4 - bis(2-pyridylmethylene)-8-thiabicyclo[3.2.1]-octan-3-one.

13. 2,4 - bis(4 - chlorobenzylidene) - 8 - thiabicyclo [3.2.1]-octan-3-one 8,8-dioxide.

14. 2,4 - bis(4 - nitrobenzylidene) - 8 - thiabicyclo [3.2.1]-octan-3-one 8,8-dioxide.

15. 2,4 - bis(2 - pyridylmethylene) - 8 - thiabicyclo-[3.2.1]-octan-3-one 8,8-dioxide.

16. 8-thiabicyclo[3.2.1]-octan-3-one 8,8-dioxide.

References Cited

UNITED STATES PATENTS 3,183,229   5/1965   Cusic et al. _____ 260—240

OTHER REFERENCES

Birch et al., J. Org. Chem., vol. 22, pp. 1590–1594, (1957).

Horak, Coll. Czech. Chem. Com., vol. 28, pp. 1614–1617 (June 1963).

Leonard et al., J. Am. Chem. Soc., vol. 79, pp. 156–160 (1957).

JOHN D. RANDOLPH, *Primary Examiner.*